United States Patent [19]
Keil et al.

[11] Patent Number: 5,513,973
[45] Date of Patent: May 7, 1996

[54] MELT SPINNING APPARATUS

[75] Inventors: Gerd Keil, Wermelskirchen; Erich Lenk; Eberhard Fenger, both of Remscheid, all of Germany

[73] Assignee: Barmag AG, Remscheid, Germany

[21] Appl. No.: 183,131

[22] Filed: Jan. 18, 1994

Related U.S. Application Data

[63] Continuation of Ser. No. 872,604, Apr. 23, 1992, abandoned.

[30] Foreign Application Priority Data

| Apr. 25, 1991 | [DE] | Germany | 41 13 518.0 |
| May 6, 1991 | [DE] | Germany | 41 14 664.6 |
| May 31, 1991 | [DE] | Germany | 41 17 956.0 |

[51] Int. Cl.⁶ .................................................... D01D 4/06
[52] U.S. Cl. .............................. 425/382.2; 264/176.1; 425/198; 425/464
[58] Field of Search ........................ 425/722, 192 S, 425/198, 378.2, 382.2, 382.4, 464, 467; 264/176.1, 171

[56] References Cited

U.S. PATENT DOCUMENTS

| 2,408,713 | 10/1946 | Webb | 425/464 |
| 3,225,383 | 12/1965 | Cobb, Jr. | 425/198 |
| 3,457,342 | 7/1969 | Parr et al. | 264/171 |
| 3,762,850 | 10/1973 | Werner et al. | 425/382.2 |
| 3,762,854 | 10/1973 | Kilsdonk | 425/382.2 |
| 4,276,011 | 6/1981 | Siegman et al. | 425/382.2 |
| 4,738,607 | 4/1988 | Nakajima et al. | 425/192 S |
| 5,035,595 | 7/1991 | Nakajima et al. | 425/192 S |
| 5,158,730 | 10/1992 | Pawelczyk et al. | 425/382.4 |

FOREIGN PATENT DOCUMENTS

| 768574 | 7/1971 | Belgium | 425/461 |
| 2117130 | 10/1971 | Germany . | |
| 486606 | 6/1938 | United Kingdom | 425/464 |

*Primary Examiner*—Jay H. Woo
*Assistant Examiner*—Joseph Leyson
*Attorney, Agent, or Firm*—Bell, Seltzer, Park & Gibson

[57] ABSTRACT

A melt spinning apparatus is disclosed which includes a supporting housing, a melt supply block mounted in the upper end of the housing, and a spin plate mounted adjacent the lower end of the housing so as to define a spinning chamber between the block and plate. A melt diverting plate is positioned in the spinning chamber for deflecting the melt entering into the chamber, and the melt diverting plate is configured such that substantially the same pressure drop occurs in the melt as it moves from the melt supply duct to all portions of the upper surface of the spin plate, so as to achieve a substantially uniform denier among the resulting filaments.

19 Claims, 2 Drawing Sheets

MELT SPINNING APPARATUS

This application is a continuation, of application Ser. No. 07/872,604, filed Apr. 23, 1992, now abandoned.

BACKGROUND OF THE INVENTION

The present invention relates to a melt spinning apparatus for spinning a plurality of polymeric filaments.

German application DE-OS 2 117 130 and U.S. Pat. No. 3,762,854 disclose a melt spinning apparatus which includes an upper melt supply block and a lower spin plate so as to define a spinning chamber therebetween. A melt diverting plate is positioned in the spinning chamber for diverting the melt entering from the melt supply plug into the chamber. With this design, it has been observed that the filaments formed by the openings of the spin plate often have differing deniers.

It is an object of the present invention to provide a melt spinning apparatus of the described type which effectively avoids the above noted condition and which is adapted to produce filaments of substantially identical deniers.

SUMMARY OF THE INVENTION

The above and other objects and advantages of the present invention are achieved in the embodiment illustrated herein by the provision of a melt spinning apparatus which comprises a housing having an internal cavity extending therethrough, a melt supply block mounted to close one of the ends of the cavity of the housing, the block including a lower surface positioned within the cavity and a melt supply duct extending through the block and communicating with the lower surface, and a spin plate mounted adjacent the other end of the cavity of the housing and including an upper surface which opposes the lower surface of the melt supply block in a spaced apart arrangement so as to define a spinning chamber therebetween. A plurality of openings extend through the spin plate and communicate with the upper surface, and a melt diverting plate is positioned in the spinning chamber for diverting the melt entering into the spinning chamber from the melt supply duct. Further, the lower surface of the melt supply block and the melt diverting plate are configured and positioned such that substantially the same pressure drop occurs in the melt as it moves from the melt supply duct to all portions of the upper surface of the spin plate, so as to achieve a substantially uniform flow rate through all of the openings of the spin plate and thus identical deniers among the resulting filaments.

In the preferred embodiment, the diverting plate includes an upper surface portion which faces the lower surface of the block, and a flange which extends longitudinally along a medial portion of the plate and engages the lower surface of the block, such that the upper surface portion of the plate and the lower surface of the block define a gap therebetween on each side of the flange. A melt flow channel extends along each side of the flange, with the channel communicating with the melt supply duct and the gap on the associated side of the flange.

A predetermined configuration of the gap between the upper surface portion of the diverting plate and the lower surface of the melt supply block with respect to the width and/or length of the flow passages permits a substantially uniform pressure drop to exist between the melt supply duct and all points located below the diverting plate.

In accordance with the present invention, several structural measures are available for controlling and minimizing the melt pressure drop between the diverting plate and the melt supply block, and for compensating for the pressure drop which does in fact occur. For example, the following measures are available for this purpose, which may be utilized alternatively or cumulatively:

a) The width of each of the horizontal channels increases starting from the melt supply duct in the longitudinal direction;

b) The transverse width of the spacing which is formed between the circumference of the diverting plate and the supporting housing increases in the longitudinal direction of the diverting plate from the transverse centerline toward each of the opposite end edges, causing the flow area in the vertical direction to change;

c) The length of flow in the horizontal gap in transverse direction decreases from the center toward the longitudinal ends of the diverting plate, in that the diverting plate is designed and constructed so that it narrows toward the longitudinal ends; and d) The vertical length of the spacing between the circumference of the diverting plate and the inside wall of the supporting housing lessens from the center toward the longitudinal ends, in that the thickness of the diverting plate decreases toward its longitudinal ends.

The measures (a) and (b) require a high degree of accuracy in the manufacture and assembly and, moreover, have the disadvantage that the pressure drop is also dependent on the structural viscosity, i.e. the material to be spun. The measure (d) involves problems in the technical design and, for this reason, does not find preferred use. The measure (c) has the advantage that a linear relationship exists between the pressure drop and the flow length in the particular horizontal gap.

The spacing between the circumference of the diverting plate and the housing preferably may be dimensioned in its transverse width such that the width has practically no influence on the pressure drop, even at the narrowest point. In this event, there exists exclusively a dependence on the measure (c).

Additional measures are available for controlling the pressure drop, as further described below.

In a preferred embodiment, the horizontal channels for a preliminary distribution of the melt are formed over the entire length of the diverting plate in that the channels extend along the flange on the diverting plate and substantially over the entire length of the spinning chamber. On the side, the channels are open toward and communicate with the associated horizontal gap. They can be machined into the underside of the melt supply block and/or into the upper side of the diverting plate facing the melt supply block. At least one melt supply duct terminates in each horizontal channel. The cross section of the channels is sufficiently large to prevent any substantial pressure drop even where the spinning head is of significant length.

A further development of the invention, in which the diverting plate narrows relative to the inside wall of the housing toward its ends, provides for an equalization of this pressure drop. The selection of a corresponding configuration of the diverting plate contour with respect to the contour of the spinning chamber or the inside wall of the housing makes it possible to largely compensate for pressure losses which are caused by the length of flow in the horizontal channels, by the increasingly lessening length of flow in the horizontal gaps between the diverting plate and the melt supply block. The widening of the transverse spacing between the circumference of the diverting plate and the housing has practically no significant influence as a result of its relatively small resistance. In any event, it is possible to achieve pressure losses which are negligibly low in comparison with the pressure losses caused by the length of flow in the horizontal gaps in transverse direction.

BRIEF DESCRIPTION OF THE DRAWINGS

Some of the objects and advantages of the present invention having been stated, others will appear as the description proceeds when taken in conjunction with the accompanying drawings, in which.

DETAILED DESCRIPTION OF THE PREFERRED EMBODIMENT

Figure 3:
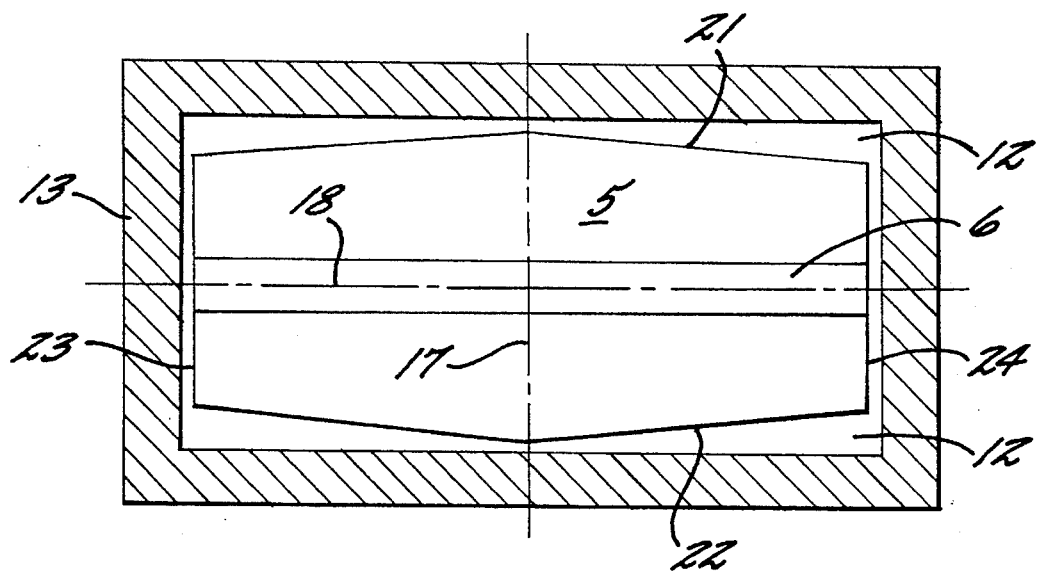
FIG. 3 is a top sectional view of the apparatus and illustrating a preferred embodiment of the diverting plate.

Referring more particularly to the drawings, a preferred embodiment of a melt spinning apparatus is illustrated which incorporates the features of the present invention. The apparatus comprises a supporting housing 13 which, as best seen in FIG. 3, is of rectangular cross sectional outline and so as to define a longitudinal centerline 18 and a transverse centerline 17. Also, the housing 13 has a vertical cavity therethrough which defines a vertical centerline 19.

A melt supply block 3 is mounted to close the upper end of the cavity of the housing, and the block 3 includes a lower surface which is positioned within the cavity. A melt supply duct 8 extends vertically through the block 3 and communicates with the lower surface. More particularly, the lower surface includes a groove 20 formed therein and which extends across the longitudinal length thereof and along the longitudinal centerline 18. A transverse duct line 9 extends transversely across the base of the groove and communicates with the melt supply duct 8.

In the illustrated embodiment, the melt supply duct 8 extends vertically through the block 3, and it should be understood that other arrangements are possible, such as where the duct 8 communicates with a side of the block 3.

A spin plate 4 is mounted at the lower end of the cavity of the housing 13. The spin plate 4 includes an upper planar surface which opposes the lower surface of the melt supply block 3 in a spaced apart relationship to define a spinning chamber 2 therebetween. The spin plate 4 includes a plurality of vertical openings 15, 16 which communicate with the upper surface and are of identical configuration. Also, a filter pack 14 is positioned upon the upper surface of the plate 4.

Figure 1:
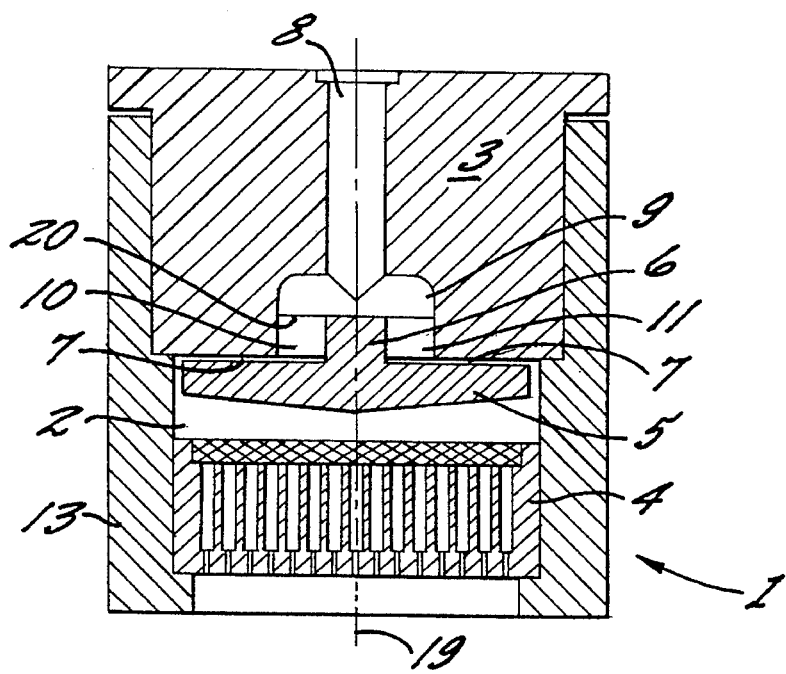
FIG. 1 is a cross sectional view of a melt spinning apparatus which embodies the present invention and taken along the vertical plane which includes the axis of the melt supply duct.
Figure 2:
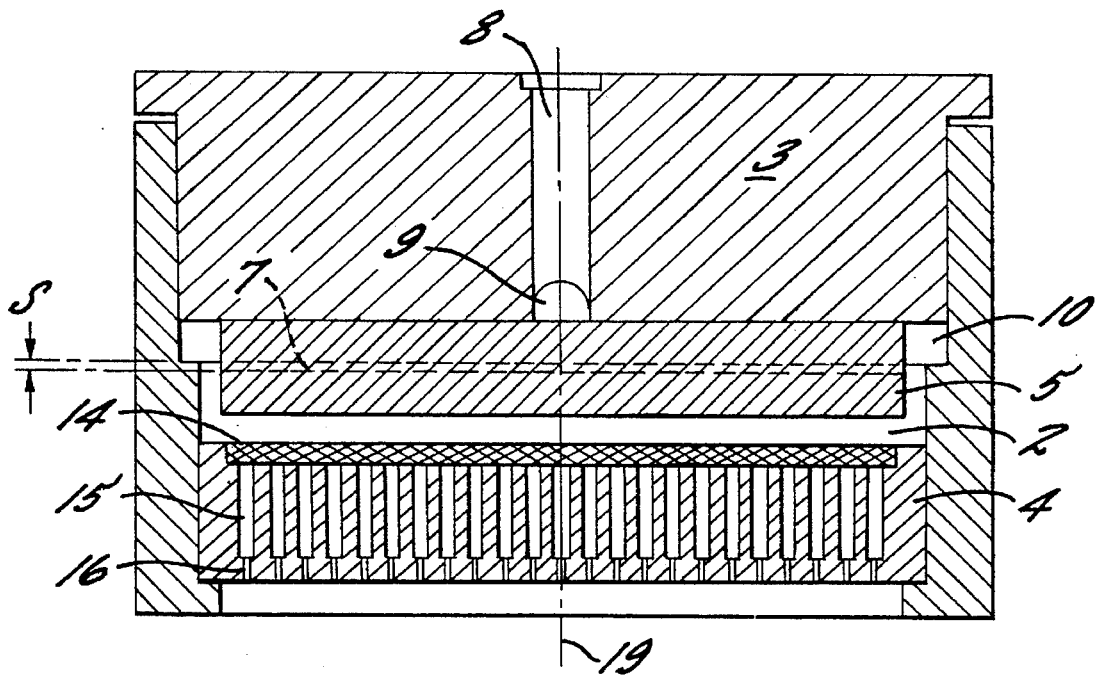
FIG. 2 is a longitudinal sectional view of the spinning apparatus.

A melt diverting plate 5 is positioned in the spinning chamber 2 in the cavity of the housing 13. The diverting plate 5 has an upper generally flat surface portion which faces the lower surface of the block, and a flange 6 is formed on the upper surface of the plate 5 which extends longitudinally along the full longitudinal length thereof. The plate 5 is positioned so that the flange 6 extends along the longitudinal centerline 18 and is received in the groove 20 so as to engage the bottom wall of the groove, and the flange is preferably joined to the base of the groove 20 by bolts (not shown). In the assembled position, a gap 7 is formed between the lower surface of the block 3 and the upper surface of the plate 5 on each side of the flange 6. Also, the flange 6 is dimensioned in the transverse direction with respect to the groove so as to define a longitudinal channel 10, 11 on each side of the flange. The channels 10, 11 thus communicate with the distributor line 9 and form a longitudinal melt flow path along each side of the flange 6 which communicates with respective ones of the gaps 7. Also, as illustrated in FIGS. 1 and 2, the groove 20 and the channels 10, 11 each have a cross sectional area when viewed in transverse cross section which is substantially uniform along the entire longitudinal length of the groove and channels. As a result, the pressure loss in the horizontal channels 10, 11 is relatively small in comparison with the pressure loss in the narrow horizontal gaps 7.

The illustrated cross-sectional configuration, and in particular the predetermined dimensioning of the cross section of the diverting plate 5 as illustrated in FIG. 3, allows a substantially more uniform flow of the melt to the spinning holes 15, 16 as compared to the prior art. More particularly, the outline of the plate 5 is configured so that the pressure losses caused by the increasing length of the channels 10, 11 in the longitudinal direction is compensated for by a reduced pressure loss in the transverse direction along the gap 7. As a result, substantially the same pressure drop occurs in the melt as it moves from the melt supply duct to all portions of the upper surface of the spin plate, so as to achieve a substantially uniform flow rate through all of the openings 15, 16 and thus a uniform denier among the filaments.

FIG. 3 is a top plan view of the plate 5, and as can be noted, the diverting plate 5 has a generally rectangular outline in plan view and includes longitudinally directed opposite side edges 21, 22 and transversely directed opposite end edges 23, 24. Also, each of the opposite side edges 21, 22 is of shallow V-shaped outline in plan view such that the transverse width of the diverting plate narrows from the transverse centerline 17 toward each of the opposite end edges 23, 24, and the spacing 12 between each of the opposite side edges 21, 22 and the housing 13 increases. As a result, the flow path of the melt through the horizontal gap 7 in the transverse direction is shortened from the center line 17 of the diverting plate 5 toward each of its end edges 23, 24. At the same time, the pressure loss in the spacing 12 formed between the outer circumference of the diverting plate 5 and the inside wall of the housing 13 becomes smaller in the direction toward the end edges 23, 24 of the diverting plate 5, since the spacing width increases. The contour of the diverting plate 5 may extend from the center line 17 respectively in a straight line, or with a convex or concave curvature, when related to the longitudinal centerline 18.

A further possibility of compensating for pressure losses, which is however more complicated in its manufacturing technique because of higher requirements as to accuracy, exists in the selection of a variable pattern of the gap width (gap height) s of the horizontal gaps 7 (flow resistance=1/s³), in particular in the transverse direction of the diverting plate, i.e., between the horizontal channel 10 or 11 respectively and the spacing 12. The gaps 7 may also widen from the transverse centerline 17 toward each of the opposite end edges 23, 24 as illustrated schematically at s' in FIG. 2a.

Figure 2A:
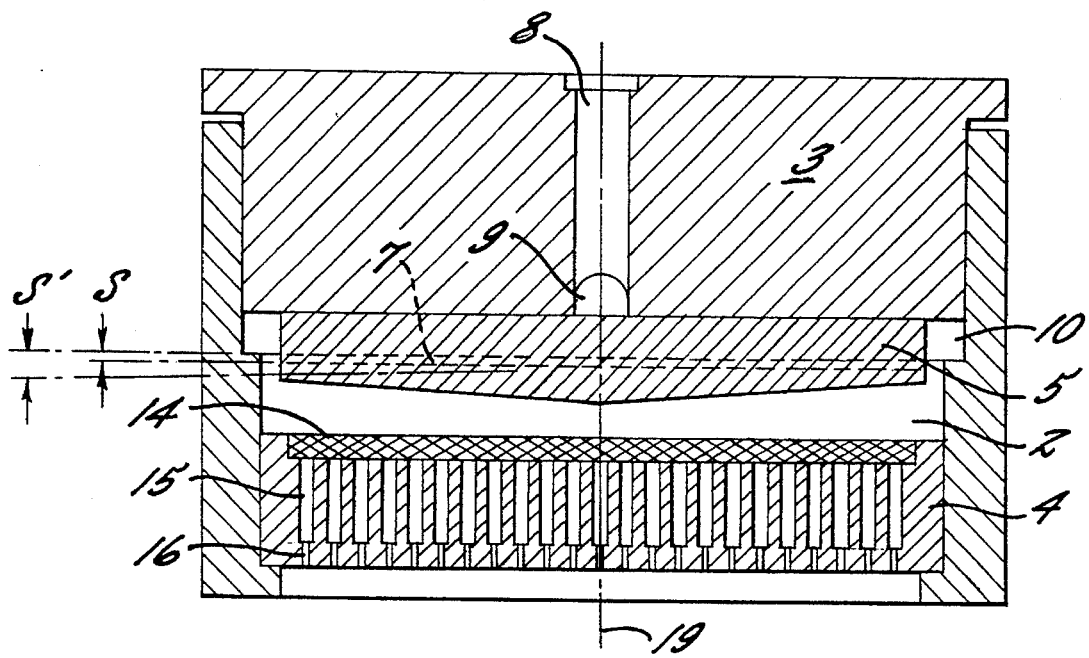
FIG. 2a is a view similar to FIG. 2 but illustrating a modified structure of the diverting plate.

The pressure drop to the spin plate 4 may be further controlled by shaping the diverting plate 5 so that its thickness decreases from the longitudinal centerline 18 toward each of the opposite side edges 21, 22, and as illustrated in FIG. 1. Further, and as illustrated in FIG. 2a, the pressure drop may also be controlled by decreasing the thickness of the diverting plate 5 from the transverse centerline 17 toward each of the opposite end edges 23, 24.

In the drawings and specification, there has been set forth a preferred embodiment of the invention, and although specific terms are employed, they are used in a generic and descriptive sense only and not for purposes of limitation.

That which is claimed is:

1. A melt spinning apparatus for spinning a plurality of polymeric filaments, comprising a housing of generally rectangular outline and so as to define a longitudinal centerline and a transverse centerline in plan view, with said housing having an internal cavity extending therethrough, a melt supply block mounted to close one of the ends of said cavity of said housing, said block including a lower surface positioned within said cavity, a melt supply duct extending through said block and communicating with said lower surface, and a groove formed in said lower surface and extending across the longitudinal length thereof and along said longitudinal centerline, and communicating with said melt supply duct, and with said groove including a bottom wall, a spin plate mounted adjacent the other end of said cavity of said housing and including an upper surface which opposes said lower surface of said melt supply block in a spaced apart arrangement so as to define a spinning chamber therebetween, and a plurality of openings extending through said spin plate and communicating with said upper surface, and a melt diverting plate mounted in said spinning chamber for deflecting the melt entering into said spinning chamber from said supply duct, said diverting plate having an upper surface portion which faces said lower surface of said block, and a flange extending between said upper surface portion and said bottom wall of said groove and extending longitudinally along said longitudinal centerline so as to position said diverting plate such that said upper surface portion of said diverting plate and said lower surface of said block define a gap therebetween on each side of said flange, and with said flange being dimensioned so that the groove, the flange, and the upper surface portion of the melt diverting plate collectively define a melt flow channel extending longitudinally along each side of said flange, and with each melt flow channel communicating with said melt supply duct and the gap on the associated side of said flange.

2. The melt spinning apparatus as defined in claim 1 wherein said diverting plate is of generally rectangular outline in plan view and includes longitudinally directed opposite side edges and transversely directed opposite end edges, and wherein each of said opposite side edges of said diverting plate is of shallow V-shaped outline in plan view such that the transverse width of said diverting plate narrows from said transverse centerline toward each of said opposite end edges, and the spacing between each of said opposite side edges and said housing increases from said transverse centerline toward each of said opposite end edges.

3. The melt spinning apparatus as defined in claim 2 wherein the thickness of said diverting plate narrows from said longitudinal centerline toward each of said opposite side edges.

4. The melt spinning apparatus as defined in claim 2 wherein the thickness of said diverting plate decreases from said transverse centerline toward each of said opposite end edges.

5. The melt spinning apparatus as defined in claim 2 wherein each of said gaps widens from said transverse centerline toward said opposite end edges.

6. A melt spinning apparatus for spinning a plurality of polymeric filaments from a polymeric melt, comprising a housing having an internal cavity extending therethrough, a melt supply block mounted to close one of the ends of said cavity of said housing, said block including a lower surface positioned within said cavity and a melt supply duct extending through said block communicating with said lower surface, a spin plate mounted adjacent the other end of said cavity of said housing and including an upper surface which opposes said lower surface of said melt supply block in a spaced apart arrangement so as to define a spinning chamber therebetween, and a plurality of openings extending through said spin plate and communicating with said upper surface, a melt diverting plate positioned in said spinning chamber for diverting the melt entering into said spinning chamber from said melt supply duct, and wherein said cavity of said housing is of rectangular cross sectional outline in plan view so as to define a longitudinal centerline and a transverse centerline, and wherein said melt diverting plate is of generally rectangular outline in plan view and includes longitudinally directed opposite side edges and transversely directed opposite end edges, wherein said melt diverting plate includes an upper surface portion which faces said lower surface of said melt supply block, and such that said upper surface portion of said melt diverting plate and said lower surface of said melt supply block define a gap therebetween, and further comprising melt flow channel means formed in at least one of said lower surface and said upper surface portion and extending along the longitudinal centerline and over the entire longitudinal length of the melt diverting plate and communicating with said melt supply duct and the gap, said melt flow channel means, when viewed in transverse cross section, having a cross sectional area which is substantially uniform along the entire longitudinal length of said melt flow channel means.

7. The melt spinning apparatus as defined in claim 6 further comprising a flange extending between said upper surface portion and said melt supply block and extending along said longitudinal centerline of said cavity of said housing and so as to divide said melt flow channel means into two melt flow channels, with each of said melt flow channels extending respectively along one side of said flange and communicating with said melt supply duct and the gap on the associated side of said flange.

8. The melt spinning apparatus as defined in claim 7 wherein each of said opposite side edges of said diverting plate is of shallow V-shaped outline in plan view such that the transverse width of said diverting plate narrows from said transverse centerline toward each of said opposite end edges, and the spacing between said opposite side edges and said housing increases from said transverse centerline toward each of said opposite end edges.

9. The melt spinning apparatus as defined in claim 7 wherein the thickness of said diverting plate decreases from said transverse centerline toward each of said opposite end edges.

10. The melt spinning apparatus as defined in claim 7 wherein each of said gaps widens from said transverse centerline toward said opposite end edges.

11. A melt spinning apparatus for spinning a plurality of polymeric filaments, comprising a housing having an internal cavity extending therethrough, a melt supply block mounted to close one of the ends of said cavity of said housing, said block including a lower surface positioned within said cavity and a melt supply duct extending through said block and communicating with said lower surface, a spin plate mounted adjacent the other end of said cavity of said housing and including an upper surface which opposes said lower surface of said melt supply block in a spaced apart arrangement so as to define a spinning chamber therebetween, and a plurality of openings extending through said spin plate and communicating with said upper surface, means for providing a substantially uniform pressure drop in the melt as it moves from said melt supply duct to said openings in said upper surface of said spin plate and including a melt diverting plate positioned in said spinning chamber for diverting the melt entering into said spinning chamber from said melt supply duct, and wherein said cavity of said housing is of rectangular cross sectional outline so as to define a longitudinal centerline and a transverse centerline and wherein said melt diverting plate is of generally rectangular outline in plan view and includes longitudinally directed opposite side edges and opposite end edges and wherein each of said opposite side edges of said diverting plate is of shallow V-shaped outline in a plan view such that the transverse width of said diverting plate narrows from said transverse centerline toward each of said opposite end edges, and the spacing between said opposite side edges and said housing increases from said transverse centerline toward each of said opposite end edges.

12. The melt spinning apparatus as defined in claim 11 wherein said melt diverting plate includes an upper surface portion which faces said lower surface of said melt supply block, and a flange extending longitudinally along a medial portion of said upper surface portion of said melt diverting plate and engaging said melt supply block and such that said upper surface portion of said melt diverting plate and said lower surface of said melt supply block define a gap therebetween on each side of said flange, and further comprising a pair of melt flow channels formed in one of said lower surface and said upper surface portion and extending along respective sides of said flange, with each melt flow channel communicating with said melt supply duct and the gap on the associated side of said flange.

13. A melt spinning apparatus for spinning a plurality of polymeric filaments, comprising a housing having an internal cavity extending therethrough, a melt supply block mounted to close one of the ends of said cavity of said housing, said block including a lower surface positioned within said cavity and melt supply duct means extending through said block and communicating with said lower surface, a spin plate mounted adjacent the other end of said cavity of said housing and including an upper surface which opposes said lower surface of said melt supply block in a spaced apart arrangement so as to define a spinning chamber therebetween, and a plurality of openings extending through said spin plate and communicating with said upper surface, means for providing a substantially uniform pressure drop in the melt as it moves from said melt supply duct to said openings in said upper surface of said spin plate and chamber for diverting the melt entering into said spinning chamber from said melt supply duct means, wherein said cavity of said housing is of rectangular cross sectional outline so as to define a longitudinal centerline and a transverse centerline, and wherein said melt diverting plate is of generally rectangular outline in plan view and includes longitudinally directed opposite side edges and opposite end edges, wherein said melt diverting plate includes an upper surface portion which faces said lower surface of said melt supply block, and such that said upper surface portion of said melt diverting plate and said lower surface of said melt supply block define a gap therebetween, and wherein the thickness of said diverting plate decreases from said transverse centerline toward each of said opposite end edges, and said uniform pressure drop means further including a flange extending between said upper surface portion and said melt supply block and extending along said longitudinal centerline of said housing, with said melt supply duct means being sized and positioned to communicate with said gap on each side of said flange.

14. The melt spinning apparatus as defined in claim 13, wherein said melt supply duct means comprises melt flow channel means formed in one of said lower surface and said upper surface portion and extending along each side of said flange, with said melt flow channel means communicating with the gap on the associated side of said flange, so as to achieve a substantially uniform flow rate through all of the openings of said spin plate and thus a uniform denier among the resulting filaments.

15. A melt spinning apparatus for spinning a plurality of polymeric filaments, comprising:

a housing comprising wall means defining an internal cavity of quadrilateral cross-section extending therethrough and so as to define a longitudinal centerline and a transverse centerline;

melt supply block means mounted at one end of said cavity and comprising a lower surface facing said cavity and melt supply duct means defining an aperture located in said lower surface;

spin plate means mounted adjacent the other end of said cavity and comprising an upper surface positioned opposite said lower surface of said melt supply block means at a predetermined distance to form a spinning chamber therebetween and comprising a plurality of openings extending through said spin plate means and communicating with said upper surface;

melt diverting plate means positioned in said spinning chamber and comprising first and second surface means respectively facing said lower surface of said melt supply block means and said upper surface of said spin plate means and peripheral surface means facing said wall means;

means including said first, second and peripheral surface means of said melt diverting plate means and said lower surface of said melt supply block means, for providing a substantially uniform pressure drop in the melt flowing from said aperture toward said openings, said uniform pressure drop means further including a gap formed between the lower surface of said melt supply block means and the first surface means of said melt diverting plate means, and elongate flange means extending from said first surface means of said melt diverting plate means to said melt supply block means and extending transversely across said aperture of said melt supply duct means and so that the gap communicates with said melt supply duct means on each side of said flange means.

16. The melt spinning apparatus as defined in claim 15, wherein said uniform pressure drop means further includes elongated groove means provided in said lower surface and communicating with said aperture, and with said flange means extending to said groove means.

17. The melt spinning apparatus as defined in claim 16, wherein the quadrilateral cross section of said cavity of said housing defines a longitudinal centerline and a transverse centerline, and wherein said elongated groove means extends along said longitudinal centerline.

18. The melt spinning apparatus as defined in claim 15, wherein said uniform pressure drop means further includes a reduction in thickness of said diverting plate means from at least one of said longitudinal and transverse centerlines toward said peripheral surface means in a direction which is perpendicular to said at least one of said longitudinal and transverse centerlines.

19. A melt spinning apparatus for spinning a plurality of polymeric filaments, comprising:

a housing comprising wall means defining an internal cavity of quadrilateral cross-section extending therethrough and so as to define a longitudinal centerline and a transverse centerline;

melt supply block means mounted at one end of said cavity and comprising a lower surface facing said cavity and melt supply duct means defining an aperture located in said lower surface;

spin plate means mounted adjacent the other end of said cavity and comprising an upper surface positioned opposite said lower surface of said melt supply block means at a predetermined distance to form a spinning chamber therebetween and comprising a plurality of openings extending through said spin plate means and communicating with said upper surface;

melt diverting plate means positioned in said spinning chamber and comprising first and second surface means respectively facing said lower surface of said melt supply block means and said upper surface of said spin plate means and peripheral surface means facing said wall means, said melt diverting plate means further defining a width dimension which extends in a direction parallel to said transverse centerline;

means including said first, second and peripheral surface means of said melt diverting plate means and said lower surface of said melt supply block means, for providing a substantially uniform pressure drop in the melt flowing from said aperture toward said openings, said uniform pressure drop means further including a reduction in said width dimension of said diverting plate means so that the width dimension diminishes as the perpendicular distance from said transverse centerline increases.

* * * * *

UNITED STATES PATENT AND TRADEMARK OFFICE
CERTIFICATE OF CORRECTION

PATENT NO. : 5,513,973

DATED : May 7, 1996

INVENTOR(S) : Keil et al

It is certified that error appears in the above-identified patent and that said Letters Patent is hereby corrected as shown below:

Column 4, line 59, change "=" to -- ≈ --.

Column 8, line 7, after "and" insert -- including a melt diverting plate positioned in said spinning --.

Signed and Sealed this

Twenty-fifth Day of March, 1997

Attest:

BRUCE LEHMAN

Attesting Officer

Commissioner of Patents and Trademarks